US012744593B2

(12) United States Patent
Delima et al.

(10) Patent No.: US 12,744,593 B2
(45) Date of Patent: Sep. 22, 2026

(54) EVENT-DRIVEN ORCHESTRATION OF WORKLOADS REQUIRING SATELLITE COMPUTING RESOURCES

(71) Applicant: INTERNATIONAL BUSINESS MACHINES CORPORATION, Armonk, NY (US)

(72) Inventors: Neil Delima, Scarborough (CA); Arunava Majumdar, Chicago, IL (US); Rahul Gupta, Leander, TX (US); Naeem Altaf, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 18/450,099

(22) Filed: Aug. 15, 2023

(65) Prior Publication Data

US 2025/0062826 A1 Feb. 20, 2025

(51) Int. Cl.
*H04B 7/185* (2006.01)

(52) U.S. Cl.
CPC ..... *H04B 7/18586* (2013.01); *H04B 7/18519* (2013.01)

(58) Field of Classification Search
CPC ........ H04B 7/185–195; H04B 7/18519; H04B 7/18586
See application file for complete search history.

(56) References Cited

U.S. PATENT DOCUMENTS

| | | | |
|---|---|---|---|
| 9,740,465 B1 * | 8/2017 | Coleman | G06F 8/60 |
| 10,726,368 B2 | 7/2020 | Bunkheila | |
| 11,528,721 B2 * | 12/2022 | Vasisht | H04B 7/195 |
| 2015/0257126 A1 * | 9/2015 | Herz | H04W 4/029 455/414.1 |
| 2018/0188056 A1 * | 7/2018 | Hardee | G01C 21/3676 |
| 2020/0019435 A1 * | 1/2020 | Stevenson | G06N 3/006 |

(Continued)

FOREIGN PATENT DOCUMENTS

CN 108960483 A 12/2018

OTHER PUBLICATIONS

Amazon Web Service (AWS), "AWS Ground Station, API Reference, API Version May 23, 2019", Last Published on Jun. 27, 2023, 172 pgs., <https://docs.aws.amazon.com/pdfs/ground-station/latest/APIReference/groundstation-api.pdf>.

(Continued)

*Primary Examiner* — Raymond S Dean
(74) *Attorney, Agent, or Firm* — Kelsey M. Skodje

(57) ABSTRACT

A computer-implemented method, a computer system and a computer program product orchestrate event-driven workloads in a satellite environment. The method includes receiving a workload from a client for deployment to a satellite in a plurality of satellites, where the workload includes requirements. The method also includes obtaining satellite data for each satellite in the plurality of satellites, where the satellite data includes a capability of the satellite and a current status of the satellite. The method further includes determining that the capability of the satellite satisfies the requirements of the workload. In addition, the method includes identifying a relevant satellite in the plurality of satellites based on the current status of the satellite. Lastly, the method includes deploying the workload to a ground station associated with the relevant satellite.

20 Claims, 2 Drawing Sheets

(56) References Cited

U.S. PATENT DOCUMENTS

| | | | | |
|---|---|---|---|---|
| 2021/0341625 | A1* | 11/2021 | Gupta | G01S 19/243 |
| 2021/0356279 | A1 | 11/2021 | Szigeti | |
| 2022/0247678 | A1 | 8/2022 | Atwal | |
| 2022/0393866 | A1* | 12/2022 | Williams | H04B 7/18508 |
| 2023/0164089 | A1 | 5/2023 | Greene | |
| 2024/0334490 | A1* | 10/2024 | Desai | H04W 74/0833 |

OTHER PUBLICATIONS

Cui, et al., "Event-triggered Deep Reinforcement Learning for Dynamic Task Scheduling in Multi-satellite Resource Allocation", IEEE Transactions on Aerospace and Electronic Systems, 2020, pp. 1-13.

Disclosed Anonymously, "A Method to Evaluate Service Workloads and Optimize Human Technical Resources Allocation to Support Such Multiple Workloads", IP.com Prior Art Database Technical Disclosure, IP.com No. IPCOM000271834D, Feb. 15, 2023, 10 pgs.

Disclosed Anonymously, "Data Locality with Apache Flight Services at Satellite Location", IP.com Prior Art Database Technical Disclosure, IP.com No. IPCOM000268173D, Jan. 4, 2022, 3 pgs.

Disclosed Anonymously, "System and Method for the Discovery, Management, and Allocation of Shared Multi-Cloud Compute Resources Using a Distributed Ledger", IP.com Prior Art Database Technical Disclosure, IP.com No. IPCOM000271836D, Feb. 16, 2023, 7 pgs.

Disclosed Anonymously, "System and Method to Develop Case Management Applications on Workload Scheduler Platform", IP.com Prior Art Database Technical Disclosure, IP.com No. IPCOM000247778D, Oct. 6, 2016, 5 pgs.

Du, et al., "A Data-Driven Parallel Scheduling Approach for Multiple Agile Earth Observation Satellites", IEEE Transactions on Evolutionary Computation, vol. 24, No. 4, Aug. 2020, pp. 679-693.

Euroconsult, "New satellite market forecast anticipates 1,700 satellites to be launched on average per year by 2030 as new entrants and incumbents increase their investment in space", [Accessed on Jul. 6, 2023], 5 pgs., Retrieved from the Internet: <https://www.euroconsult-ec.com/press-release/new-satellite-market-forecast-anticipates-1700-satellites-to-be-launched-on-average-per-year-by-2030-as-new-entrants-and-incumbents-increase-their-investment-in-space/>.

IBM, "The New Space Age: IBM Develops a Unique, Custom Edge Computing Solution in Space", IBM.com, [Accessed Jul. 13, 2023], 9 pgs., Retrieved from the Internet: <https://www.ibm.com/cloud/blog/ibm-develops-a-unique-custom-edge-computing-solution-in-space>.

Microsoft, "Azure Orbital Documentation", Microsoft Azure, Downloaded from <https://azure.microsoft.com/en-us/products/orbital/> on Jul. 5, 2023, 108 pgs.

PRNewswire, "Global Space On-board Computing Platform Market Research Report 2022: Demand for Earth Observation Imagery and Analytics & New Application Areas for Cubesats", Research and Markets, Jun. 20, 2022, 6 pgs., <https://www.prnewswire.com/news-releases/global-space-on-board-computing-platform-market-research-report-2022-demand-for-earth-observation-imagery-and-analytics--new-application-areas-for-cubesats-301571001.html >.

* cited by examiner

EVENT-DRIVEN ORCHESTRATION OF WORKLOADS REQUIRING SATELLITE COMPUTING RESOURCES

BACKGROUND

Embodiments relate generally to the field of managing and providing access to computing resources on satellites and, more specifically, to orchestrating computing workloads requiring satellite computing resources on an event-driven basis using workload and satellite characteristics.

In today's technology landscape, there are many satellites in orbit around the Earth, with many more expected to be launched and maintained. These satellites may have many different uses, including but not limited to communications or a variety of terrestrial and celestial research projects, in addition to many other priorities. There is also a growing demand for the varying computing capabilities and characteristics of satellites on a request-driven basis, and workloads may be orchestrated to match the capabilities and characteristics of the satellites and associated ground stations that may be in service with requirements and execution parameters of event-driven workloads.

SUMMARY

An embodiment is directed to a computer-implemented method for orchestrating event-driven workloads in a satellite environment. The method may include receiving a workload from a client for deployment to a satellite in a plurality of satellites, where the workload includes requirements. The method may also include obtaining satellite data for each satellite in the plurality of satellites, where the satellite data includes a capability of the satellite and a current status of the satellite. The method may further include determining that the capability of the satellite satisfies the requirements of the workload. In addition, the method may include identifying a relevant satellite in the plurality of satellites based on the current status of the satellite. Lastly, the method may include deploying the workload to a ground station associated with the relevant satellite.

In another embodiment, the method may include uploading the workload from the ground station to the relevant satellite and downloading a workload result at a second ground station associated with the relevant satellite, where the workload result is generated by running the workload on the relevant satellite. In this embodiment, the method may also include transmitting the workload result to the client.

In a further embodiment, the identifying the relevant satellite in the plurality of satellites may also include determining that the client does not have permission to access the relevant satellite and updating the current status of the relevant satellite.

In yet another embodiment, wherein the satellite data includes an orbital path, a current location, a current workload status and a workload schedule, the identifying the relevant satellite may include determining an availability of the satellite from the current workload status and the workload schedule for each satellite in the plurality of satellites and calculating a predicted location of the satellite at a time of the availability using the current location and the orbital path for each satellite in the plurality of satellites. In this embodiment, the method may also include identifying the relevant satellite in the plurality of satellites based on the predicted location of the satellite and the availability of the satellite.

In still another embodiment, the method may include obtaining a set of ground stations associated with the satellite from the satellite data for each satellite in the plurality of satellites and selecting the ground station associated with the relevant satellite from the set of ground stations associated with the satellite based on the predicted location of the satellite.

In another embodiment, the method may include receiving a notification from the ground station associated with the relevant satellite that the workload cannot be deployed to the relevant satellite and updating the current status of the satellite based on the notification.

In a further embodiment, the identifying the relevant satellite may use a machine learning model that predicts the relevant satellite for the workload based on the satellite data obtained in prior workloads.

In addition to a computer-implemented method, additional embodiments are directed to a computer system and a computer program product for orchestrating event-driven computing workloads in a satellite environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
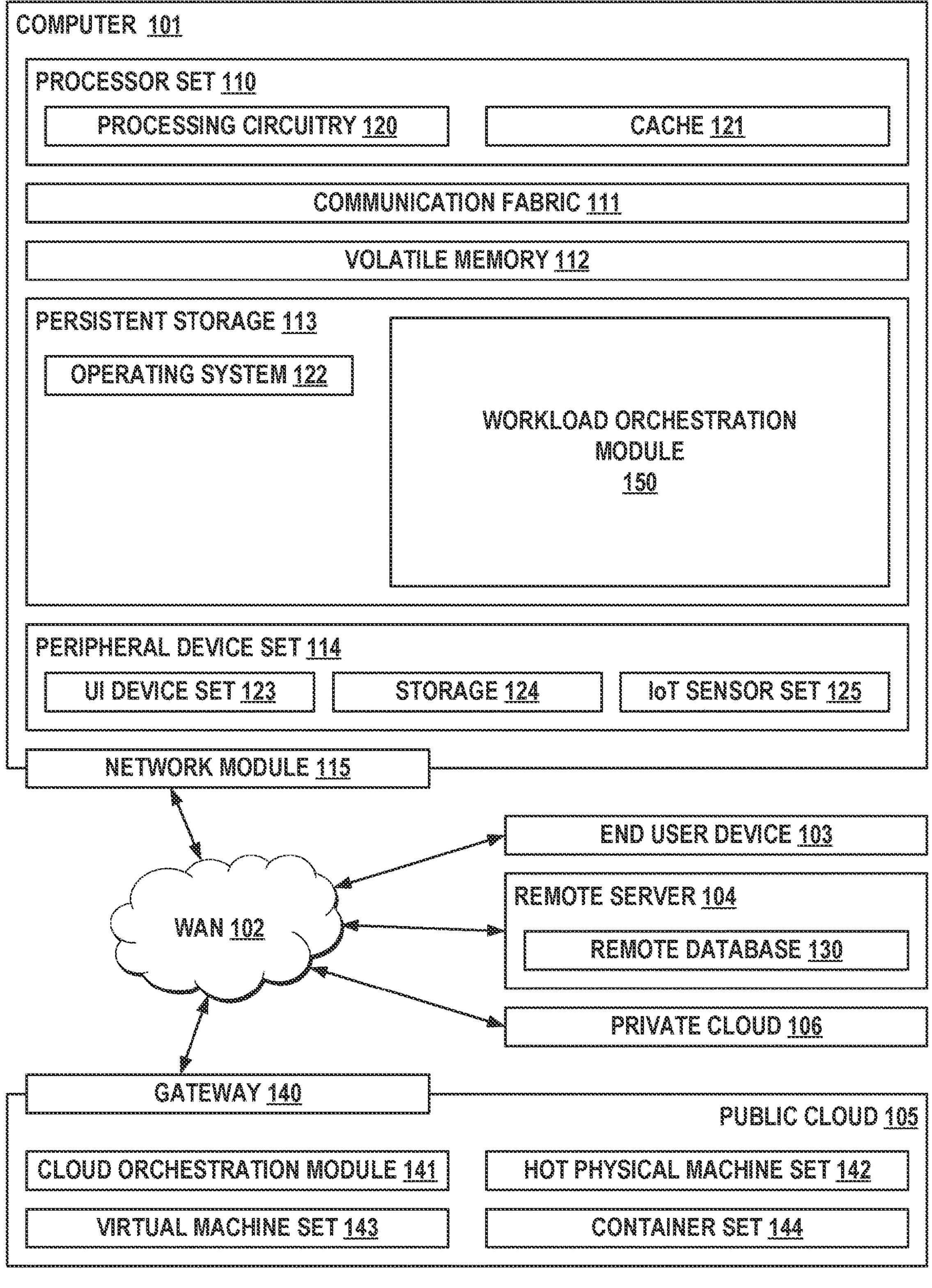
FIG. 1 depicts a block diagram of an example computer system in which various embodiments may be implemented.

The world is seeing a proliferation of satellites in orbit above the Earth. For instance, it is expected that close to 1,700 satellites per year may be launched between now and 2030. These satellites may contain payloads with varying characteristics and computing capabilities that will likely increase substantially in the coming years. Some of the drivers behind this include a rise in space exploration missions, new applications and an increased use of small satellites and Cubesats for research opportunities such as observation imagery and analytics applications. However, the cost of launching a satellite or owning computing resources in space may be costly and may introduce operational complexity which are beyond the reach and expertise of the broader market of potential consumers. As a result, it may be more problematic to fulfill sporadic, i.e., event-driven, requests for use of satellite resources from customers that do not already own and operate satellites currently in orbit. As an example, an entity may wish to acquire satellite photos of a particular area on Earth for a research purpose, which would represent an event. If the entity does not have access to its own satellite, the request, as represented by a workload with computing requirements, would need to be forwarded to another entity that owns or operates a relevant satellite for the request. The satellite owner may have received many requests all at once, related to the same or different events, that may need to be processed and deployed to appropriate locations.

It may therefore be useful to provide a method or system to orchestrate event-driven computing workloads in a satellite environment. Such a method or system may match a workload to a relevant satellite by identifying and cataloguing the computing capabilities of each satellite in a plurality of satellites being operated and determining that the capability of a relevant satellite satisfies the computing requirements of a request or workload. The method or system may also obtain a current status of each satellite that may include an orbital path and a set of ground stations along the orbital path that are associated with the satellite, along with a current location and status of computing workloads both in operation and also scheduled to run on the satellite. The method or system may predict an availability of a specific satellite to fulfill the request and calculate a predicted location of the satellite at the time that the satellite may be predicted to be available. The method or system may use the availability and predicted location of the satellite to deploy the workload to an appropriate ground station that may allow access to the computing capability of the satellite and thereby fulfill the received request. Such a method or system may increase the efficiency and use of satellite computing resources, such that cost is reduced to an owner or operator of satellites by ensuring that the satellite is consistently in use and also allowing for more customers to be able to access satellite resources that they do not own or operate to fulfill their requests by processing a computing workload.

Referring to FIG. 1, computing environment 100 contains an example of an environment for the execution of at least some of the computer code involved in performing the inventive methods, such as workload orchestration module 150. In addition to workload orchestration module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and workload orchestration module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in workload orchestration module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in workload orchestration module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to orchestrate event-driven computing workloads in a satellite environment. In particular, workload orchestration module 150 may receive a request for satellite computing resources in the form of a computing workload for satellite deployment that may include computing requirements for completion, which may be in the form of specific hardware or software routines or may alternatively be in the form of a job to be performed. For example, a request may be made for satellite images, in which case it may be inferred that the satellite must include a camera as the computing requirement. The workload orchestration module 150 may further obtain satellite data for each satellite in a plurality of satellites that may be under common management or control, either through a joint owner or operator or pooled together under an arrangement for common control. The obtained satellite data may include both fixed profile information of the satellite, e.g., the computing capability of the satellite or an orbital path that may also indicate a set of ground stations that may be associated with the satellite, and also current status information that may be constantly updated, e.g., the current location of the satellite and the status of computing workloads that may be running and scheduled to run on the satellite. The satellite data may also include an access level, such that specific workloads may be prohibited from running on specific satellites based on the access level, and also information about external factors such as solar flares or weather events that may prevent transmission from a ground station to the satellite within specific time windows.

The workload orchestration module 150 may use the computing capability of each satellite to filter out those satellites that do not satisfy the requirements of the computing workload and then identify a relevant satellite from the remaining satellites. As described herein, a relevant satellite may first be able to satisfy the computing requirements but then be available, at which point the location of the satellite may be important. Therefore, the workload orchestration module 150 may determine an availability of each satellite through an understanding of the status of computing workloads that may be running on the satellite and also scheduled to run on the satellite. The workload orchestration module 150 may also calculate a predicted location of the satellite at a time that the satellite is determined to be available using the orbital path and current location of the satellite. Then, having identified a relevant satellite at a specific location and time, the workload orchestration module 150 may determine the appropriate ground station associated with the relevant satellite and deploy the workload to the ground station for transmission to the relevant satellite at the scheduled time.

Figure 2:
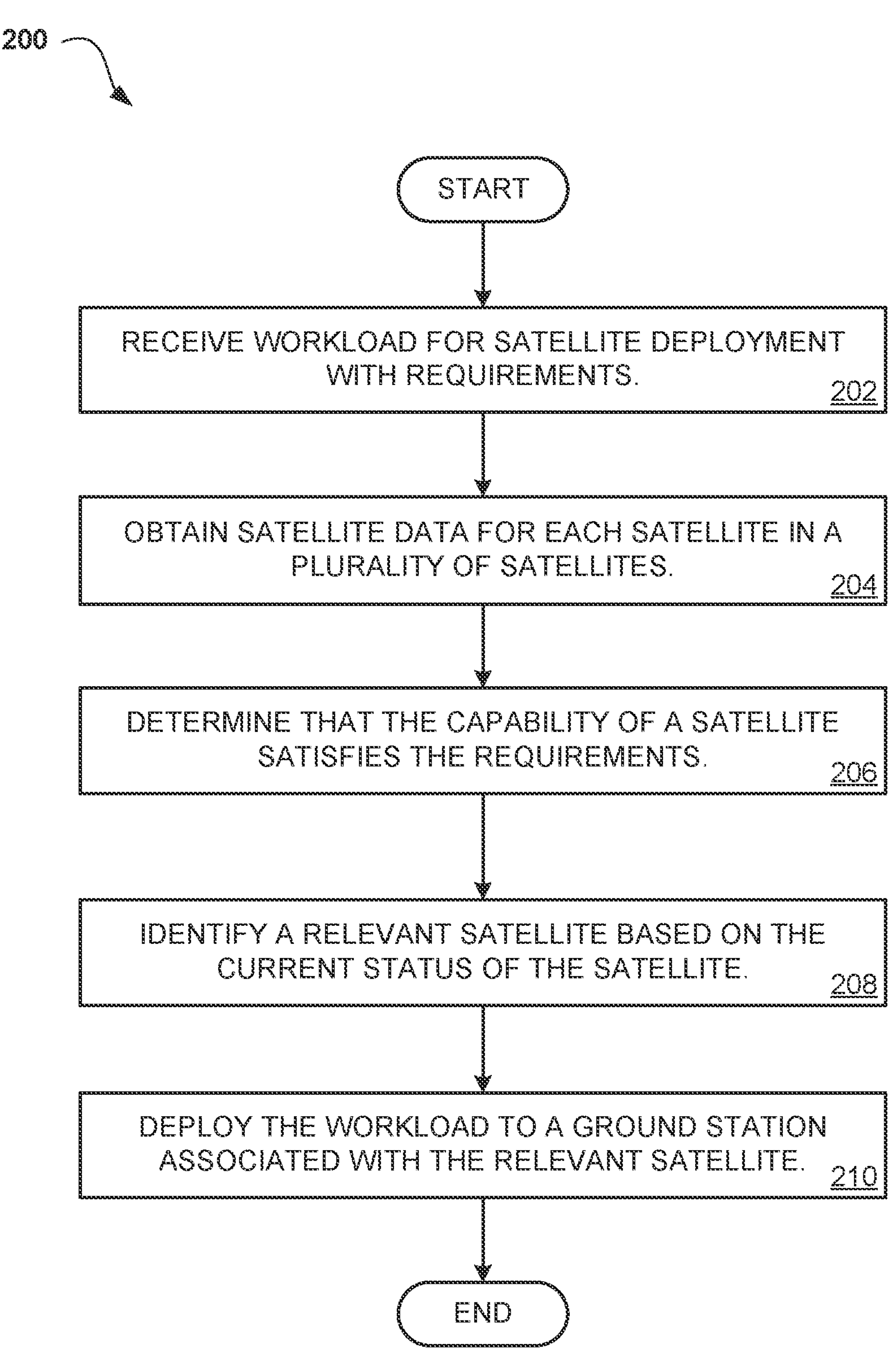
FIG. 2 depicts a flow chart diagram for a process that orchestrates event-driven computing workloads in a satellite environment according to an embodiment.

Referring to FIG. 2, an operational flowchart illustrating a process 200 that orchestrates event-driven computing workloads in a satellite environment is depicted according to at least one embodiment. At 202, a workload may be received with specified requirements, which may include specific levels of computing resources and/or execution parameters for processing. As an example, gravitational or electromagnetic field research may be taking place and real-time or ongoing satellite imagery or measurements may be desired or required to add to a corpus of data supporting the research. The entity conducting the research may or may not own or operate a satellite and may wish to obtain access to one or more satellites under independent control. In making a request, the requirements for processing a satellite image may be determined, e.g., the need for a camera or for a certain level of hardware resources such as CPU or memory, and included along with a computing workload in a form that may be forwarded to an appropriate satellite. One of ordinary skill in the art will recognize that there are many forms that such a workload may take, including but not limited to a code snippet or container image, and it is only required that a workload with known requirements is presented to the workload orchestration module 150 for satellite deployment.

At 204, satellite data may be obtained for each satellite in a plurality of satellites. The satellite data may be stored in a database that may be maintained by an owner or operator of satellites or in a global database that may be maintained by a local, national or international entity as part of a regulatory or other agreement among public or private officials in the satellite industry. Such a database may include information about physical and operational characteristics, e.g., payload and sensor details such as antenna specifications, orbital path, payload, CPU, memory, disk, camera and other sensor specifications, or software capabilities such as programming languages or libraries. Other characteristics included in the satellite data may be information about access restrictions to a satellite based on factors such as the identity of a user or entity making a request or a time-based restriction, e.g., certain satellites may be locked out from other requests during specific hours, or may also include geographic data sharing restrictions involving regulatory specifications with respect to satellites, where a national permit to launch and operate a satellite may have usage restrictions that may be relevant to a request. In addition to specific characteristics, or computing capabilities, of individual satellites, a set of ground stations that may be associated with individual satellites, either through common ownership or operation or due to location based on the orbital path of a satellite, may be maintained in the satellite data.

In addition to fixed characteristics or capabilities that may be stored for an individual satellite, real-time current status of individual satellites may also be monitored by the workload orchestration module 150. An example of characteristics that may be monitored at this step may include a current location of an individual satellite, which may include a specific ground station that may currently be communicating with the satellite or at least be capable of communicating with the satellite. The current status within the satellite data may also include the state of workloads that may be running or may be scheduled to run, e.g., in a queue, on the satellite, and also external factors, e.g., weather events, that may affect transmission or other operations of the satellite, even including celestial events such as current or future solar flares. Included in this current status may be information about specific ground stations, including an assessment of the ability of specific ground stations to communicate with its associated satellite, where the ground station may be part of the set of ground stations mentioned above.

At 206, the computing capability of each satellite in the plurality of satellites may be checked to determine that the requirements of the workload are satisfied. One of ordinary skill in the art will recognize that there are many ways to measure the computing capabilities of the satellite and the requirements of the workload. For example, there may be simple hardware requirements, such as memory or CPU, that may be checked against a threshold. Another method may be to understand the requirements of a specific job, e.g., collecting images in a specific field of vision, and determining that the satellite is capable of performing a task that may be represented by the workload. It is not required for the workload orchestration module 150 to collect specific characteristics of the satellite or workload, but rather to make a determination that a specific satellite for which the workload orchestration module 150 has data satisfies the requirements of the workload. It should be noted that in the event that the computing capability of the satellite does not meet the workload requirements, the satellite may not be identified as the relevant satellite, as described below.

At 208, a relevant satellite may be identified in the plurality of satellites based on a current location of the satellite and an availability of the satellite that may be predicted from a workload status and workload schedule for the satellite, external factors such as weather or solar flares, and also a level of access to the satellite, e.g., if access is not permitted, then the workload cannot be deployed. The current location of the satellite, along with the orbital path that may be retrieved from the satellite data, and an associated ground station that may be found using the predicted location of the satellite and the set of ground stations in the satellite data, may be used to calculate a predicted location of the satellite at a time of availability, which may further inform the identification of a relevant satellite. Calculation of the predicted satellite location may be done in real-time and may include updated information about the satellite, such as planned changes in the orbit of the satellite for maintenance or other reasons. In an embodiment, the relevant satellite may be identified by leveraging a decision tree, where the first set of branches may be based on the computing capability of each node, as described in 206, followed by time and location parameters at the next depth level in the decision tree, followed by other parameters such as node availability. Another embodiment of this step may be running a SQL query with the satellite data stored in a relational database.

In a further embodiment, a supervised machine learning model may be trained to predict the relevant satellite for the workload based on information about prior workloads that may have been received for satellite deployment of computing resources. One or more of the following machine learning algorithms may be used: logistic regression, naive Bayes, support vector machines, deep neural networks, random forest, decision tree, gradient-boosted tree, multilayer perceptron. One of ordinary skill in the art will recognize that this is a non-limiting list of algorithms that may be used at this step. In an embodiment, an ensemble machine learning technique may be employed that uses multiple machine learning algorithms together to assure better classification when compared with the classification of a single machine learning algorithm. In this embodiment, training data for the model may comprise information about prior workloads, which may include the satellite data that may be obtained above, e.g., both computing capability and other characteristics that may be fixed in relation to a specific satellite at a specific time and current status information that may be more dynamic, such as a location of a satellite in its orbit or the state of workloads on a satellite, both running and scheduled. The training data may be collected from a single prior workload or client or from multiple workloads from several clients over a longer period of time. The results may be stored in a database so that the data is most current, and the output would always be up to date.

At 210, the workload may be deployed to a ground station associated with the relevant satellite. As mentioned above, the ground station may be predicted as part of the identification step, where the location of the satellite at a time of availability may be predicted and then, using the predicted location and the known orbital path of the satellite from the satellite data, a specific ground station may be selected to upload the workload to the satellite. It should be noted that the communication between the ground station and the satellite may be monitored and, if the workload cannot be uploaded to the satellite for any reason, the workload orchestration module 150 may be notified of the problem in a suitable manner, such that the current status may be updated and a new ground station or satellite may be identified, and in turn allow the workload orchestration module 150 to refine the process of identifying the relevant satellite. One of ordinary skill in the art will recognize that a notification received by the workload orchestration module 150 may take many forms, including an automated message that a problem was encountered, such that action may be taken either by a human operator or the workload orchestration module 150 automatically. Reasons that a workload could not be uploaded from the ground station to the satellite, or downloaded from a satellite to a ground stations, may include new weather data or solar flare information that indicate an outage or the client does not have permission to access the relevant satellite, as well as restrictions that may be in place in the geographic region of the ground station or an indication that the ground station does not currently have the capability to upload to the satellite. It should be understood that this list is not meant to be an exhaustive list but rather present examples of why a ground station may not be able to communicate with a satellite.

The workload orchestration module 150 may monitor or facilitate the actual upload of the workload to the satellite, including packaging the workload in an appropriate manner, e.g., as a container, such that the satellite may interpret the workload correctly. The satellite may process the workload and download results back to the same ground station, or to another ground station as needed based on the location of the satellite at the time that the workload may be complete, where the same monitoring mentioned above may be in place for the download from satellite to ground station. The workload orchestration module 150 may validate the results of the workload, e.g., evaluate the quality of images that may have been desired by the client, and transmit the workload result back to the client if the result passes validation. One of ordinary skill in the art will recognize that the workload may be transmitted back to the client in any form that may be appropriate for the transmission medium or client specifications. The result of the validation process may further provide feedback to the machine learning model or other mechanism that may be used to identify the relevant satellite. It should be noted that the validation process is not limited to an automatic process of the workload orchestration module 150 but may include manual feedback from a client that the workload orchestration module 150 may then incorporate into the process of identifying the relevant satellite.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for orchestrating event-driven computing workloads in a satellite environment, the computer-implemented method comprising:

receiving a workload and a request for satellite computing resources to deploy the workload from a client, wherein the workload corresponds to an event, and wherein the request includes requirements for a computing capability to complete the workload;

obtaining satellite data for a plurality of satellites, wherein the satellite data includes computing capabilities and current statuses of the plurality of satellites;

predicting, based on the current statuses, locations and availabilities of the plurality of satellites during the event ;

identifying a relevant satellite for the request in the plurality of satellites, wherein the identifying comprises traversing a decision tree having a first set of branches based on the computing capabilities and subsequent sets of branches based on parameters comprising the locations and availabilities;

identifying ground stations capable of communicating with the relevant satellite;

scheduling a time for the workload to be deployed to the relevant satellite;

predicting a location of the relevant satellite at the scheduled time;

selecting, based on the predicted location, a ground station from the identified ground stations;

deploying the workload to the selected ground station at the scheduled time; and determining, based on data from monitoring the relevant satellite and the selected ground station, whether to download results of processing the workload to the selected ground station.

2. The computer-implemented method of claim 1, further comprising:

based on a result of the determining, downloading a workload result at a second ground station from the identified ground stations, wherein the workload result is generated by running the workload on the relevant satellite; and transmitting the workload result to the client.

3. The computer-implemented method of claim 1, wherein the identifying the relevant satellite in the plurality of satellites further comprises:

determining that the client does not have permission to access a first satellite from the plurality of satellites; and updating a current status of the first satellite.

4. The computer-implemented method of claim 1, wherein the current statuses include an orbital path, a current location, a current workload status, and a workload schedule for each satellite, and the predicting comprises:

predicting an availability of the satellite from the current workload status and the workload schedule; and predicting a location of the satellite using the current location and the orbital path.

5. The computer-implemented method of claim 1, further comprising:

receiving a notification from at least one of the identified ground stations that the workload cannot be deployed to the relevant satellite; and updating a current status of the relevant satellite based on the notification.

6. The computer-implemented method of claim 1, further comprising training a machine learning model for predicting a relevant satellite for a next workload based on the satellite data.

7. A computer system for orchestrating event-driven computing workloads in a satellite environment, the computer system comprising:

one or more processors, one or more computer-readable memories, and one or more computer-readable storage media; and program instructions, stored on at least one of the one or more computer-readable storage media for execution by at least one of the one or more processors via at least one of the one or more computer-readable memories, the program instructions comprising:

program instructions to receive a workload and a request for satellite computing resources to deploy the workload from a client, wherein the workload corresponds to an event, and wherein the request includes requirements for a computing capability to complete the workload;

program instructions to obtain satellite data for a plurality of satellites, wherein the satellite data includes computing capabilities and current statuses of the plurality of satellites;

program instructions to predict, based on the current statuses, locations and availabilities of the plurality of satellites during the event;

program instructions to identify a relevant satellite based on the request in the plurality of satellites by traversing a decision tree having a first set of branches based on the computing capabilities and subsequent sets of branches based on parameters comprising the locations and availabilities;

program instructions to identify ground stations capable of communicating with the relevant satellite;

program instructions to schedule a time for the workload to be deployed to the relevant satellite;

program instructions to predict a location of the relevant satellite at the scheduled time;

program instructions to select, based on the predicted location, a ground station from the identified ground stations;

program instructions to deploy the workload to the selected ground station at the scheduled time; and program instructions to determine, based on data from monitoring the relevant satellite and the selected ground station, whether to download results of processing the workload to the selected ground station.

8. The computer system of claim 7, the program instructions further comprising:

program instructions to download, based on a result of the determining, a workload result at a second ground station from the identified ground stations, wherein the workload result is generated by running the workload on the relevant satellite; and program instructions to transmit the workload result to the client.

9. The computer system of claim 7, wherein the program instructions to identify the relevant satellite in the plurality of satellites further comprise:

program instructions to determine that the client does not have permission to access a first satellite from the plurality of satellites; and program instructions to update a current status of the first satellite.

10. The computer system of claim 7, wherein the current statuses include an orbital path, a current location, a current workload status, and a workload schedule of each satellite and the program instructions to predict the locations and availabilities comprise:

program instructions to predict an availability of the each satellite from the current workload status and the workload schedule; and program instructions to predict a location of the each satellite at a time of the availability using the current location and the orbital path.

11. The computer system of claim 7, the program instructions further comprising:

program instructions to receive a notification from at least one of the identified ground stations that the workload cannot be deployed to the relevant satellite; and program instructions to update a current status of the relevant satellite based on the notification.

12. The computer system of claim 7, wherein the program instructions further comprise program instructions to train a machine learning model for predicting a relevant satellite for a next workload based on the satellite data.

13. A computer program product for orchestrating event-driven computing workloads in a satellite environment, the computer program product comprising:

one or more computer-readable storage media; and program instructions stored on at least one of the one or more computer-readable storage media, the program instructions comprising:

program instructions to receive a workload and a request for satellite computing resources to deploy the workload from a client, wherein the workload corresponds to an event, and wherein the request includes requirements for a computing capability to complete the workload;

program instructions to obtain satellite data for a plurality of satellites, wherein the satellite data includes computing capabilities and current statuses of the plurality of satellites;

program instructions to predict, based on the current statuses, locations and availabilities of the plurality of satellites during the event;

program instructions to identify a relevant satellite based on the request in the plurality of satellites by traversing a decision tree having a first set of branches based on the computing capabilities and subsequent sets of branches based on parameters comprising the locations and availabilities;

program instructions to identify ground stations capable of communicating with the relevant satellite;

program instructions to schedule a time for the workload to be deployed to the relevant satellite;

program instructions to predict a location of the relevant satellite at the scheduled time;

program instructions to select, based on the predicted location, a ground station from the identified ground stations; and program instructions to deploy the workload to a ground station associated with the relevant satellite.

14. The computer program product of claim 13, the program instructions further comprising:

program instructions to download a workload result at a second ground station from the identified ground stations, wherein the workload result is generated by running the workload on the relevant satellite; and program instructions to transmit the workload result to the client.

15. The computer program product of claim 13, wherein the program instructions to identify the relevant satellite in the plurality of satellites further comprise:

program instructions to determine that the client does not have permission to access a first satellite from the plurality of satellites; and program instructions to update a current status of the first satellite.

16. The computer program product of claim 13, wherein the current statuses include an orbital path, a current location, a current workload status, and a workload schedule of each satellite and the program instructions to predict the locations and availabilities comprise:

program instructions to predict an availability of the each satellite from the current workload status and the workload schedule; and program instructions to predict a location of the each satellite at a time of the availability using the current location and the orbital path.

17. The computer program product of claim 13, further comprising:

program instructions to receive a notification from at least one of the identified ground stations that the workload cannot be deployed to the relevant satellite; and program instructions to update a current status of the relevant satellite based on the notification.

18. The computer-implemented method of claim 1, wherein the determining whether to download the results of processing the workload to the selected ground station is based on a current location of the relevant satellite.

19. The computer-implemented method of claim 1, wherein the determining whether to download the results of processing the workload to the selected ground station is based on an external factor detected by the monitoring.

20. The computer-implemented method of claim 19, further comprising, in response to the detected external factor, downloading the results of processing the workload to a different ground station.

* * * * *